United States Patent
Kallianpur et al.

(10) Patent No.: US 8,312,448 B2
(45) Date of Patent: Nov. 13, 2012

(54) CONFIGURATION TO ORDER SOFTWARE DEPLOYMENT AND MANAGEMENT

(75) Inventors: Vijayanand Muralidhar Kallianpur, San Diego, CA (US); Sean Patrick Kennedy, San Diego, CA (US); Jeffrey Tay Sulm, Sunnyvale, CA (US); Masafumi Kuboyama, Yokohama (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1140 days.

(21) Appl. No.: 12/144,916

(22) Filed: Jun. 24, 2008

(65) Prior Publication Data

US 2009/0320018 A1 Dec. 24, 2009

(51) Int. Cl.
*G06F 9/445* (2006.01)
(52) U.S. Cl. ......... 717/177; 717/174; 717/175; 717/176
(58) Field of Classification Search ........... 717/174–177
See application file for complete search history.

(56) References Cited

U.S. PATENT DOCUMENTS

| | | | | | |
|---|---|---|---|---|---|
| 5,278,973 | A | * | 1/1994 | O'Brien et al. | 717/168 |
| 5,367,686 | A | * | 11/1994 | Fisher et al. | 717/174 |
| 5,504,889 | A | * | 4/1996 | Burgess | 1/1 |
| 5,715,463 | A | * | 2/1998 | Merkin | 717/175 |
| 5,894,571 | A | * | 4/1999 | O'Connor | 713/2 |
| 5,995,757 | A | * | 11/1999 | Amberg et al. | 717/175 |
| 6,182,275 | B1 | * | 1/2001 | Beelitz et al. | 717/175 |
| 6,543,047 | B1 | * | 4/2003 | Vrhel et al. | 717/121 |
| 6,742,180 | B1 | * | 5/2004 | Ritz | 717/174 |
| 7,237,239 | B1 | * | 6/2007 | Goel et al. | 717/170 |
| 2003/0233648 | A1 | * | 12/2003 | Earl et al. | 717/176 |
| 2004/0129789 | A1 | * | 7/2004 | Silverbrook et al. | 235/494 |
| 2007/0169090 | A1 | * | 7/2007 | Kang | 717/168 |
| 2007/0240154 | A1 | * | 10/2007 | Gerzymisch et al. | 717/174 |
| 2008/0307175 | A1 | * | 12/2008 | Hart et al. | 711/162 |

* cited by examiner

*Primary Examiner* — Chat Do
*Assistant Examiner* — Sergio J Curbelo, III
(74) *Attorney, Agent, or Firm* — John L. Rogitz

(57) ABSTRACT

In a configuration-to-order (CTO) software provisioning system, software upgrade/downgrade support, software running change support, and software file server management are provided in part using microcode typically stored on a user computer BIOS.

15 Claims, 5 Drawing Sheets

RUNNING CHANGE SUPPORT

FILE SERVER MANAGEMENT

CONFIGURATION TO ORDER SOFTWARE DEPLOYMENT AND MANAGEMENT

FIELD OF THE INVENTION

The present invention relates generally to systems and methods for software integration and factory deployment of the software.

BACKGROUND OF THE INVENTION

Producing consumer electronics and in particular computers that might incorporate, in addition to operating systems with various configurations and suites of applications, several subsystems, each in turn with their own software drivers, can be complicated particularly in the context of "configure to order", or "CTO", since each individual order typically is different from others. Not only must a bill of materials (BOM) be defined, managed, and conformed to, but product defects and corrective actions must also be managed in way that ensures corrective action can be known and taken across the globe.

For example, many computers are sold on a configure to order/build to order (CTO/BTO) basis. Each software part can have a multidimensional relationship with each stock keeping unit (SKU) that represents a product when region, language, various operating system versions, and platforms are factored in. Thus, each software part can potentially have dozens of version releases to accommodate all of these variables. As understood herein, software management is further complicated by the desire of some users to upgrade or downgrade their software to run on higher or lower bit buses and by so-called "running changes", i.e., changes to software that are made after the original software has been delivered.

SUMMARY OF THE INVENTION

A method includes receiving a microcode definition for first configure to order (CTO) software options for a computer. A user of the computer may select a subset of the CTO software options for installation on the computer. The method also includes generating a microcode definition for second CTO software options and writing microcode to the computer that represents both CTO options. Only user selections from the first CTO software options are installed on the computer.

Recovery disks are made that bear both microcode definitions and all programs in both the first and second CTO software options. As an example, the first CTO software options can include 64 bit software and the second CTO software options can include 32 bit software options corresponding to the 64 bit CTO software options. If desired, both CTO software options may be for a single predetermined computer model.

With this in mind, the method can further include receiving a user request for a change of grade (upgrade or downgrade) for a selected program from the first CTO software option to the second CTO software option. The recovery disk is provided to the user. The user's computer can access the microcode and based thereon, for a program sought be upgraded/downgraded from the first CTO option to the second CTO option, copying from the disk to the computer a corresponding version of the program from the second CTO option.

In another embodiment, in response to a running change to a first program in a group of configure to order (CTO) software from which users may select software, a snapshot is generated of the group of CTO software including the first program as affected by the running change. Also, a list of items in the snapshot is generated and then a mapping between microcode bits and respective items in at least one snapshot is generated. The microcode bits are provided to user computers.

A disk bearing plural snapshots and associated lists is provided to at least first and second users. For illustration, assume that a computer of the first user is associated with the first program while a computer of the second user is not associated with the first program and thus is not affected by the running change. The disk is useful by the first user to copy the first program as affected by the running change to the computer of the first user. As an example, the computer of the first user can access the microcode to determine the first program affected by the running change to copy from the disk.

In another aspect, a method includes establishing bits in microcode loaded onto at least a first user computer to represent at least a first program affected by a running change, and/or at least a second program in an upgraded format and a downgraded format.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

In the present non-limiting implementation, only part of the software data may be contained in a data store referred to below as "database A". Specifically, software data that is visible to customers (e.g., operating systems, configure to order/build to order (CTO/BTO) options, software highlighted on web sites, etc.) can be entered into database A. Periodically, some of the data from database A can be pushed to a comprehensive global database referred to herein as database "B", including both stock keeping unit (SKU) data and software data.

Software data that is not as visible to customers (such as operating system updates, device drivers, utilities, etc.) can be added to the bill of materials (BOM) through the comprehensive global database. Software can be checked into the comprehensive global database by developers, vendors or engineers, along with metadata that describes the software for process tools. The BOM for a specific series/language/region is frozen/locked and the process to create the factory deliverables (software image, software modules, and data) can then be started. Various process tools and manual process can be used to create the factory deliverables, all of which use data stored in the comprehensive global database.

Figure 1:
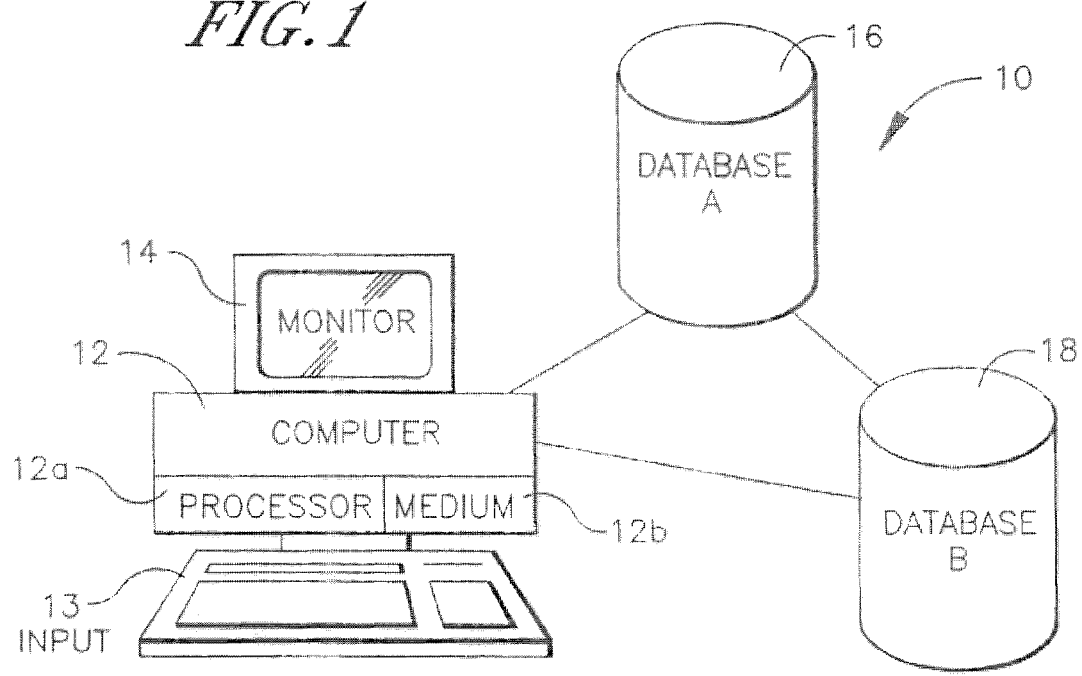
FIG. 1 is a block diagram of a non-limiting example system in accordance with present principles.

FIG. 1 shows details of one non-limiting implementation of present principles. FIG. 1 illustrates that the present methods may be undertaken by a computer system 10 including one or more enterprise computers 12, each having its own processor 12a and tangible computer-readable medium 12b, input device 13 such as a keyboard, mouse, etc., and output device such as a monitor 14 or other output device such as a network. The medium 12b can be disk storage or solid state storage or other type of electronic storage. The enterprise computers 12 can be used by developers and software engineers to execute present principles. Thus, the logic and the databases herein (including the database 16 and global database 18, referred to herein as "database B") may be distributed over plural computers if desired, and some of the method steps may be undertaken by human users of the enterprise computers 12 while other method steps can be undertaken automatically by logic resident on computer readable media in computers. The computer readable media can include but is not limited to RAM, ROM, floppy disks, hard disk drives, optical disk drives, solid state memory devices, etc.

Figure 2:
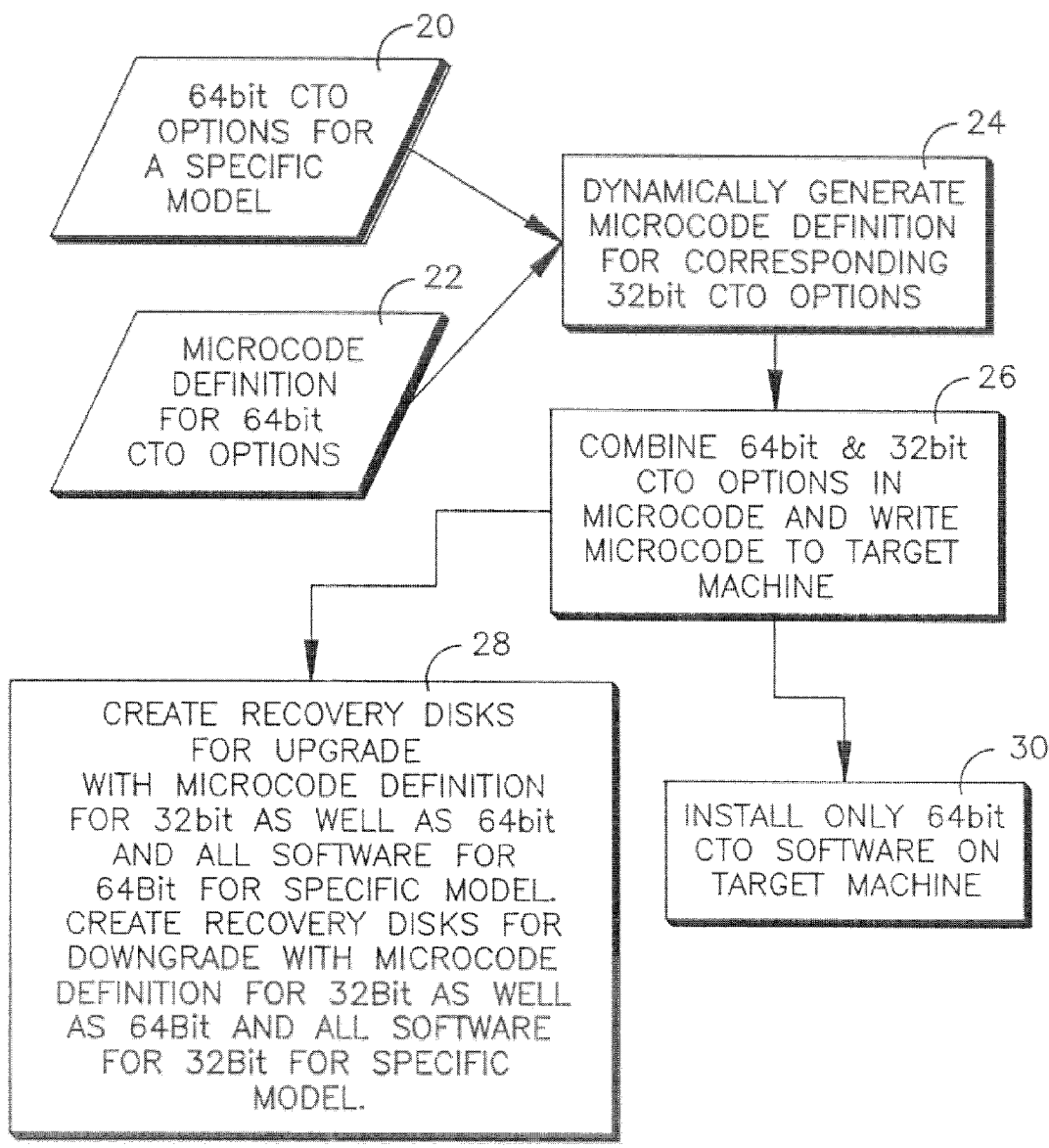
FIG. 2 is a flow chart of logic for providing software upgrade/downgrade support.
Figure 3:
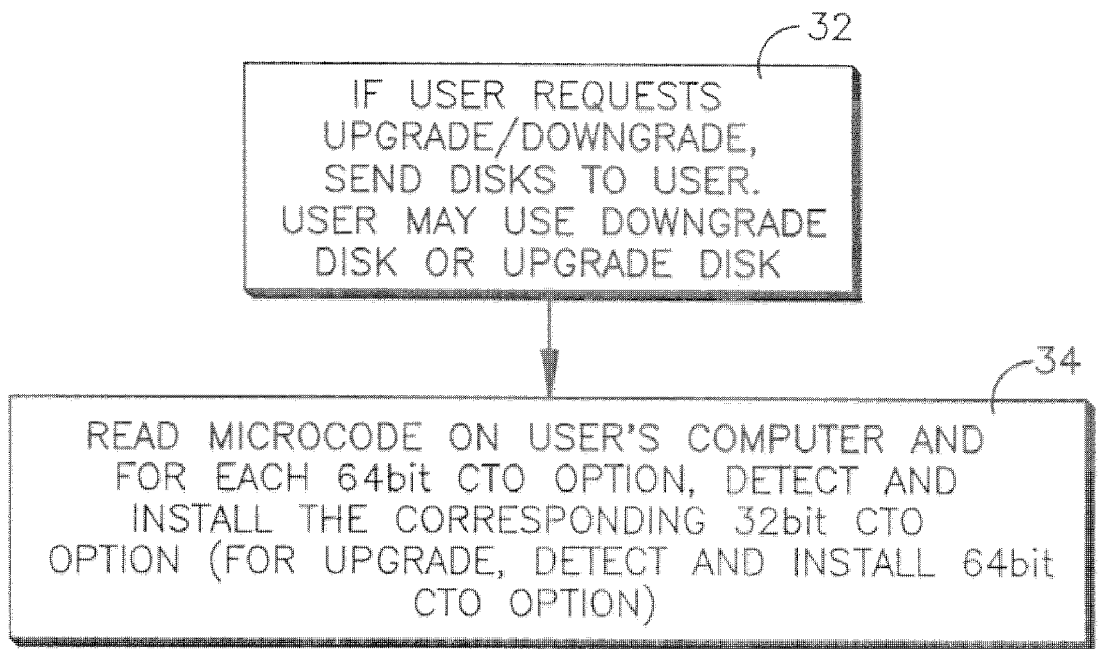
FIG. 3 is an additional flow chart of logic for providing software upgrade/downgrade support.

FIGS. 2 and 3 show logic for supporting upgrades and downgrades to software on a user's computer. For example, a user may wish to downgrade a 64 bit program (i.e., programs configured for a 64 bit operating system or indeed a 64 bit operating system itself) to 32 bit or upgrade a 32 bit program to 64 bit, it being understood that conversions between different specific formats are contemplated herein.

Commencing at state 20, 64 bit CTO options from which a user can select particular programs are established, if desired for a predetermined computer model. Microcode, each bit of which maps to a respective program in the 64 bit CTO options (to establish a "microcode definition" of the CTO options), is also established at state 22. In one embodiment the microcode contains eighty bits, and each bit maps to a respective program in a CTO option. A bit value of "zero" indicates that the corresponding program is not in the particular customer's CTO, while a bit value of "one" indicates the opposite, it being understood that the opposite convention may be used.

The same steps can be repeated for other CTO options, e.g., for 32 bit programs, or the process may move to state 24 to dynamically generate a microcode definition of CTO options that essentially are 32-bit (or some other format) versions of at least some of the 64 bit programs in the first CTO option of block 20. In other words, at block 24 it may be determined which of the 64 bit programs of state 20 have 32 bit versions, and a microcode definition of those counterparts is generated.

At state 26, the two versions of microcode may be combined or otherwise associated with each other and written into a user computer (typically, into BIOS) that is associated with a particular CTO. In this way, the microcode establishes a link between each 64 bit program that has a 32 bit counterpart version.

Recovery disks are created at state 28 with both microcode definitions and all software, both 64 bit and 32 bit versions thereof, being written to the disks. In contrast, at state 30 only the requested format of software is loaded onto the user computer in accordance with the user's CTO. As indicated in FIG. 2, it will be assumed for purposes of illustration that the user has initially requested 64 bit software.

After the user has been provided with the CTO computer, the user may wish, for various reasons, to upgrade or downgrade certain programs from one format to another. Continuing the above illustration, assume the user wishes to downgrade a 64 bit program to its 32 bit version. Commencing at state 32 in FIG. 3, a user request for a change of grade is received, and the disks created at state 28 in FIG. 2 are provided to the user who can choose the downgrade or upgrade option. The disks may be physically provided or virtually provided by making the software on the disks available on a network.

In any case, at state 34 the user's computer accesses the microcode to detect which 64 bit program(s) the user has ordered from among the CTO options have 32 bit counterpart versions. The corresponding counterpart is then copied into the user computer (typically to its hard drive or to an optical disk) from the recovery disk.

Figure 4:
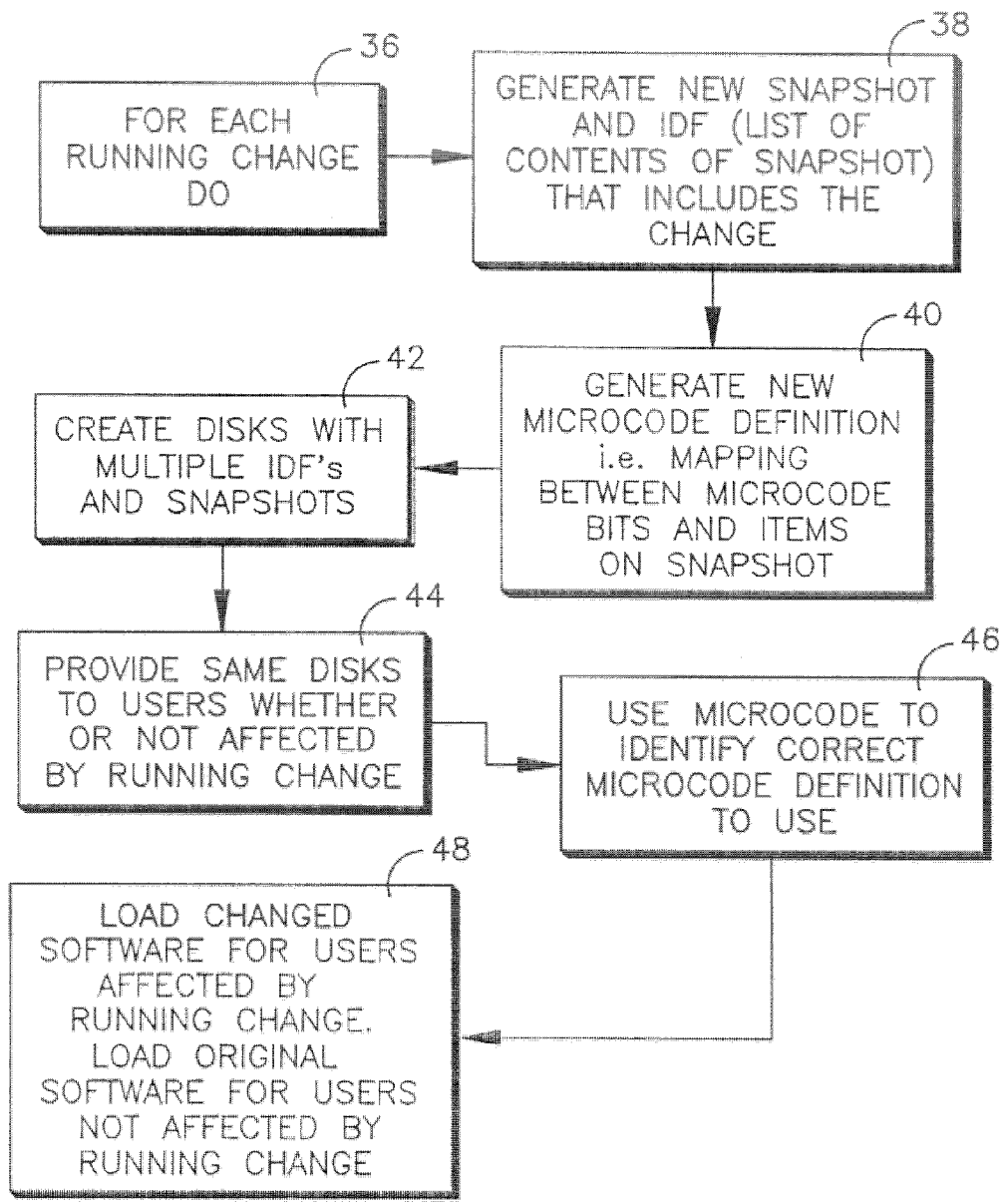
FIG. 4 is a flow chart of logic for providing software running change support.

FIG. 4 illustrates a method for running change support. At state 36, in response to a running change to a program in a group of configure to order (CTO) software from which users may select software, the method generates at state 38 a snapshot of the group of CTO software including the first program as affected by the running change. The method also generates a list of items in the snapshot and at state 40 generates a mapping between microcode bits and respective items on the snapshot. The microcode bits are provided to user computers.

At state 42, disks are created bearing multiple snapshots and associated lists. Then, at state 44 the disks are provided users. Assume for illustration that the disks are provided to a first user and a second user, and that a computer of the first user is associated with the first program (that is affected by the running change) whereas the computer of the second user is not.

At state 46, the computer(s) access the microcode generated at state 40 to identify the correct definition to use for their particular CTO builds. Using this definition, at block 48 the changed software is loaded from the disk to the appropriate computer, in this case, to the first user computer but not to the second user computer.

Figure 5:
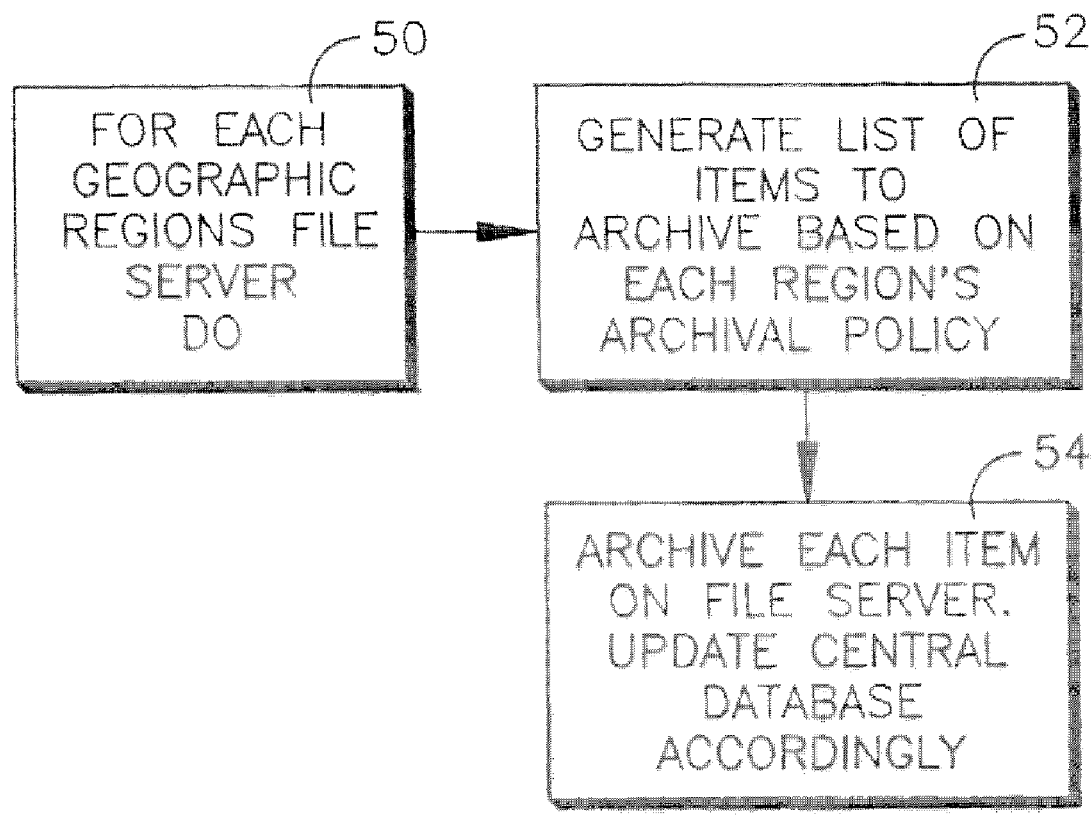
FIG. 5 is a flow chart of logic for providing software file server management.

FIG. 5 illustrates file server management that may be used. At block 50, if desired the method may be executed for CTO file servers by geographic region, with each file server typically accessing a respective local database. At block 52 a list of items to archive is generated based on the particular region's archival policy. Moving to block 54, each item to be archived is archived as dictated by policy, with a central database (e.g., 18 in FIG. 1) being updated accordingly.

A bill of materials (BOM) setting for CTO options may be created not only for each series and language region but also for each operating system.

While the particular CONFIGURATION TO ORDER SOFTWARE DEPLOYMENT AND MANAGEMENT is herein shown and described in detail, it is to be understood that the subject matter which is encompassed by the present invention is limited only by the claims.

What is claimed is:

1. A method comprising:
   receiving a microcode definition for first configure to order (CTO) software options for a computer, wherein a user of the computer may select a subset of the CTO software options for installation on the computer;
   generating a microcode definition for second CTO software options;
   writing microcode to the computer representing both CTO options; and
   installing on the computer only user selections from the first CTO software options, wherein a first bit in the microcode maps to a first program among the CTO software options, wherein an adjacent second bit in the microcode maps to a second program among the CTO software options.

2. The method of claim 1, comprising establishing at least one recovery disk bearing both microcode definitions and all programs in both the first and second CTO software options.

3. The method of claim 2, wherein the first CTO software options include 64 bit software and the second CTO software options include 32 bit software options corresponding to at least some of the 64 bit CTO software options.

4. The method of claim 2, comprising:
receiving a user request for a change of grade for at least one selected program from the first CTO software option to the second CTO software option; and
providing the recovery disk to the user, whereby the computer can access the microcode and based thereon, for at least a first program from the first CTO option, copying from the disk to the computer a corresponding version of the program from the second CTO option.

5. The method of claim 1, wherein both CTO software options are for a single predetermined computer model.

6. A method comprising:
in response to a running change to at least a first program in a group of configure to order (CTO) software from which users may select software, generating a snapshot of the group of CTO software including the first program as affected by the running change;
generating a list of items in the snapshot;
generating a mapping between microcode bits and respective items in at least one snapshot, the microcode bits being provided to user computers;
establishing at least one disk bearing plural snapshots and associated lists; and
providing the at least one disk to at least first and second users, a computer of the first user being associated with the first program, a computer of the second user not being associated with the first program and thus not being affected by the running change, the disk being useful by the first user to copy the first program as affected by the running change to the computer of the first user, wherein a first bit in the microcode maps to a first program among the CTO software options, wherein an adjacent second bit in the microcode maps to a second program among the CTO software options.

7. The method of claim 6, wherein the computer of the first user accesses the microcode to determine the first program affected by the running change to copy from the disk.

8. A method establishing bit in microcode, wherein the bits represent a first program, and the method comprises:
in response to a running change to the first program, the first program being in a group of configure to order (CTO) software from which users may select software, generating a snapshot of the group of CTO software including the first program as affected by the running change;
generating a list of items in the snapshot;
generating a mapping between microcode bits and respective items in at least one snapshot, the microcode bits being provided to user computers;
establishing at least one disk bearing plural snapshots and associated lists; and
providing the at least one disk to at least first and second users, a computer of the first user being associated with the first program, a computer of the second user not being associated with the first program and thus not being affected by the running change, the disk being useful by the first user to copy the first program as affected by the running change to the computer of the first user, wherein a first bit in the microcode maps to a second program wherein a second bit in the microcode maps to a third program among the CTO software options.

9. The method of claim 8, wherein the computer of the first user accesses the microcode to determine the first program affected by the running change to copy from the disk.

10. The method of claim 8, wherein the bits represent a second program, and the method comprises:
receiving a microcode definition for first configure to order (CTO) software options for a computer, the options including the second program, wherein a user of the computer may select a subset of the CTO software options for installation on the computer;
generating a microcode definition for second CTO software options;
writing microcode to the computer representing both CTO options; and
installing on the computer only user selections from the first CTO software options.

11. The method of claim 10, comprising establishing at least one recovery disk bearing both microcode definitions and all programs in both the first and second CTO software options.

12. The method of claim 11, wherein the first CTO software options include 64 bit software and the second CTO software options include 32 bit software options corresponding to at least some of the 64 bit CTO software options.

13. The method of claim 11, comprising:
receiving a user request for a change of grade for the second program from the first CTO software option to the second CTO software option; and
providing the recovery disk to the user, whereby the computer can access the microcode and based thereon, for at least the second program among the first CTO options, copying from the disk to the computer a corresponding version of the program from the second CTO option.

14. The method of claim 10, wherein both CTO software options are for a single predetermined computer model.

15. The method of claim 8, wherein the bits represent the first program and a second program.

* * * * *